Figure 1:
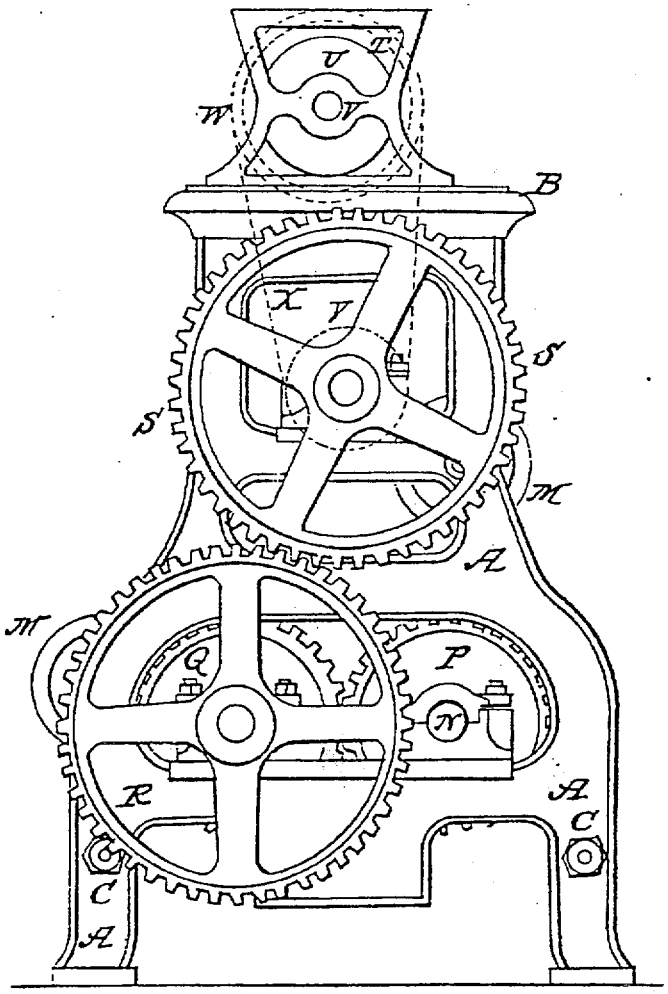

4 Sheets—Sheet 1.

J. WEIS.

Flouring Mill.

No. 473.

Reissued June 16, 1857.

R. PETERS, Photo-Lithographer, Washington, D. C.

J. WEIS.

Flouring Mill.

No. 473.

Reissued June 16, 1857.

R. PETERS, Photo-Lithographer, Washington, D.C.

J. WEIS.

Flouring Mill.

No. 473. Reissued June 16, 1857.

4 Sheets—Sheet 4.

J. WEIS.

Flouring Mill.

No. 473. Reissued June 16, 1857.

R. PETERS, Photo-Lithographer, Washington, D.C.

UNITED STATES PATENT OFFICE.

JOSEPH WEIS, OF BORDENTOWN, NEW JERSEY.

IMPROVEMENT IN FLOURING-MILLS.

Specification forming part of Letters Patent No. 14,179, dated January 24, 1856; Reissue No. 473, dated June 16, 1857.

*To all whom it may concern:*

Be it known that I, JOSEPH WEIS, of Bordentown, county of Burlington and State of New Jersey, have invented certain new and useful Improvements in Flouring-Mills; and I do hereby declare that the following is a full, clear, and exact description of the same, reference being had to the accompanying drawings and to the figures and letters of reference marked thereon.

My invention relates to flouring-mills in which the grain is acted upon by metal grinding-surfaces, which consist in a hoop or hoops of cast-steel covering the entire surface of a tapering cast-iron burr, on the entire surface of which hoop or hoops I cut a series of teeth in disjointed lines obliquely with the axis of the burr. This steel-covered tapering burr I cause to revolve its circumference in proximity with the inside surface of a semicircular tapering shield, which is allowed to slide laterally on guides secured permanently to the frames of the machine, the same guides preventing the shield from turning with the burr. On the inside of this shield are dovetailed longitudinal pieces of cast-steel with longitudinal grooves between each piece. The dovetailed pieces are curved and tapering so as to assimilate to the circumference of the burr, and on their concave surfaces are also cut teeth oblique with the axis of the burr, but inclined in a contrary direction to those of the latter. By an adjusting screw connected to the frames of the machine, and acting on a nut attached to the shield, the latter may be moved backward and forward on the guides in a line parallel with the axis of the burr, so that the concave surface of the shield, with its file-cut steel pieces, may be brought in more or less proximity with the steel-faced burr. The grain is submitted to the action of the burr and shield combined, the teeth of which, being inclined in contrary directions, cross each other, and have a most powerful cutting and grinding effect on the grain. The longitudinal grooves between the dovetailed steel pieces serve the purpose of catching the grain after it passes over one set of teeth and changes its course before it is picked up by the next steel piece. The grain leaves the shield at the point where the latter terminates, and is guided so as to drop on the circumference of a second steel-covered tapering burr; passing between that and a second tapering shield is discharged below, ground to the consistency required. The whole is so geared and arranged as to occupy but little space compared with its efficiency, and has the additional advantage over the ordinary burr-stones of being adapted to grind damp grain. On account of the peculiar construction of the teeth my mill separates the bran from the grain more effectually, so that the flour is manufactured more purely white and free from that reddish color common to flour manufactured by the usual process.

In order to enable others skilled in the art to make and use my invention, I will now proceed to describe its construction and operation.

Figure 5:
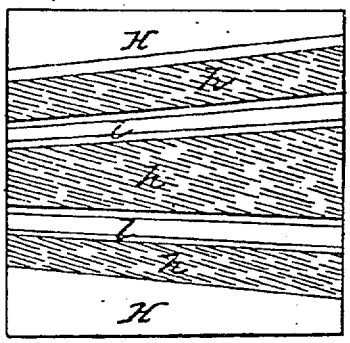
Figure 2:
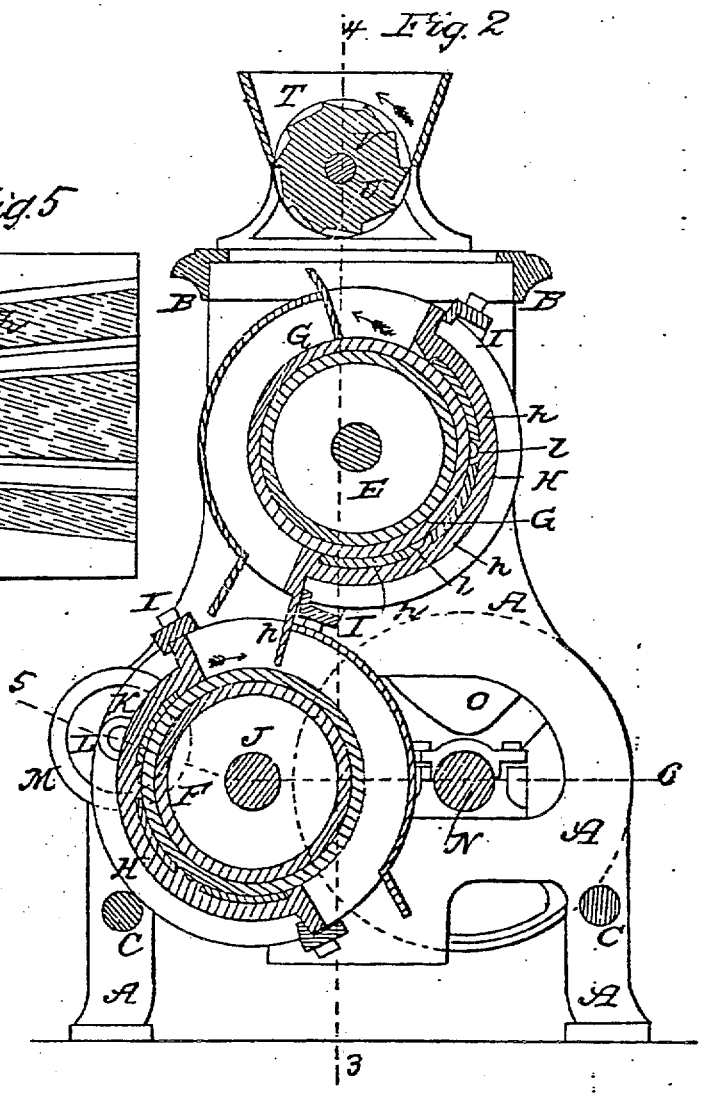
Figure 3:
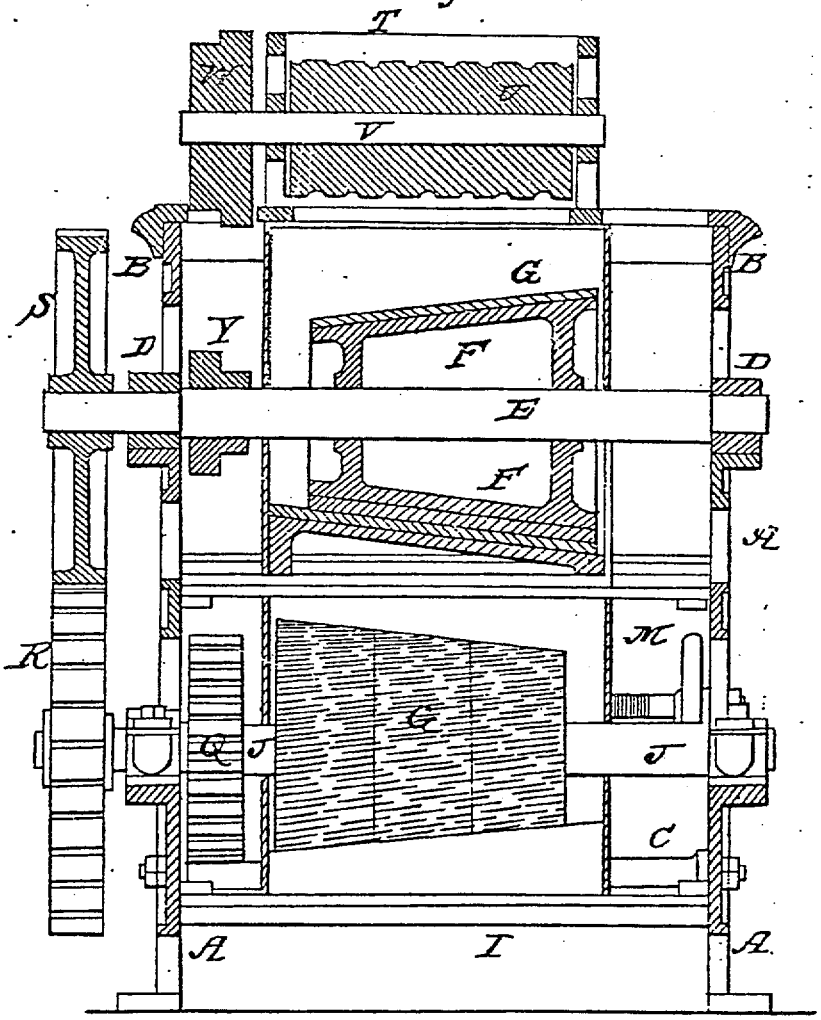
Figure 4:
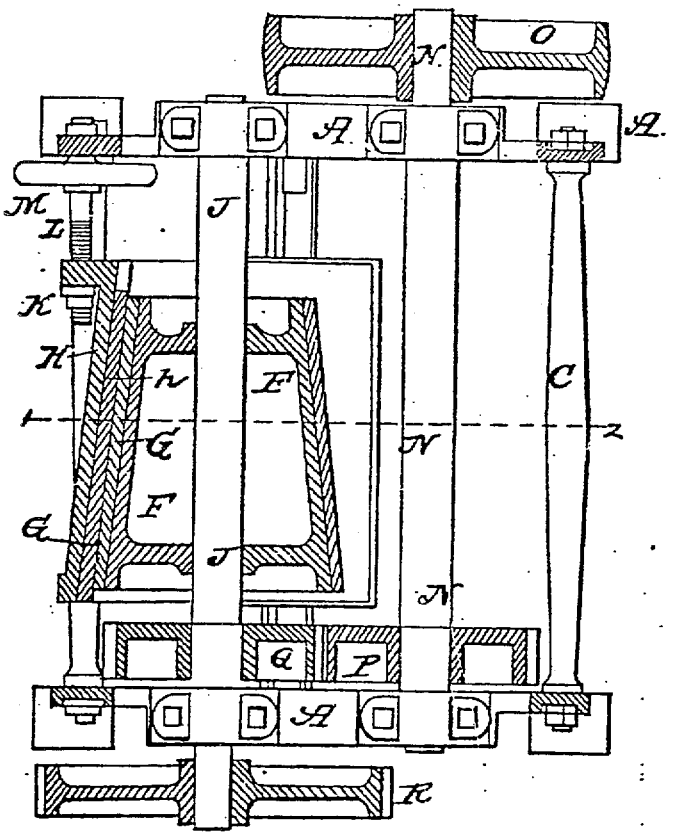

On reference to the drawings, which form a part of this specification, Figure 1 is an end elevation showing the exterior of my improved flouring-mill; Fig. 2, a transverse sectional elevation of the same on the line 1 2, Fig. 4; Fig. 3, a longitudinal sectional elevation of the mill on the line 3 4, Fig. 2; Fig. 4, a sectional plan on the line 5 6, Fig. 2; Fig. 5, an inside view of one of the shields.

A A are the two side frames of the machine, which are connected together at the top by the entablature B, and toward the bottom of the cross-stays C, to each of the frames A, are secured the pedestals D D, which form the bearings for the shaft E. To this is secured the circular tapering burr E, round which is tightly secured the cast-steel covering G, which may be formed of one piece or of a series of hoops with their edges in contact with each other. Having turned the steel surface of the burr, I cut thereon a series of teeth, similar to those of an ordinary coarse file, the said teeth being cut in disjointed lines obliquely with the axis of the burr.

H is a semicircular tapering shield of cast-iron, having flanges on each side, and notched so as to fit the guides I, which are parallel with the axis of the burr, and their ends being permanently secured to the inside of the opposite frames. Three or more steel pieces, *h*, are fitted in dovetailed grooves cut longitudinally inside the tapering shield H, so that their surfaces may assimilate to the circumference of the steel-covered burr. Between each of the steel pieces *h* are the longitudinal grooves *i*, for a purpose hereinafter referred to. The concaved surfaces of the steel pieces *h* have likewise file-cut teeth also obliquely with the axis of the burr, the obliquity of the teeth on the burr and of those on the steel pieces *h* being in contrary directions. Below the shaft E is a second shaft, J, which has also its bearings on the opposite frames of the machine. On this shaft is a tapering burr with steel covering similar to that above described, and in proximity with this is a semicircular tapering shield, similar to that above referred to, and guided in ways I in a similar manner. In order to bring the concave surface of the semicircular shield and that of the steel-covered burr closer to or farther from each other, I attach to the inside of one of the flanges of the shield a nut, R, for the reception of the screw L, the end of the latter being connected to the frame A, so as to swivel therein without having any lateral movement. The screws L are furnished with handle-wheels M, so that on turning the screws by the same the shields may be made to slide backward and forward on the ways I, and their file-cut steel pieces consequently brought nearer to or farther from the file-cut surfaces of the covered burrs.

N is the driving-shaft, having also its bearings on the opposite frames A A. This shaft is furnished with a driving-wheel, O, on one side of the machine for receiving the driving-strap, and has a spur-wheel, P, inside the frames, which, gearing into a similar wheel, Q, on the shaft J causes the latter, and with it the steel-faced burr, to revolve in the direction of the arrow. Outside the machine the shaft J is furnished with another spur-wheel, R, which, gearing into the wheel S on the shaft E, causes the upper burr to revolve in the direction of its arrow, so that on turning the pulley N the upper and lower burr have a simultaneous movement imparted to them.

T is the hopper secured to the top of the frame, and in the lower mouth of this hopper is the roller U, on the surface of which are a series of indentations, *t*. The feed-roller is attached to the shaft V, which has its bearings on the ends of the hopper, and is furnished with two or more different-sized pulleys, W, round either of which may pass the strap X from the pulleys Y on the shaft E, so that the strap may be passed from one set of pulleys to the other, and the speed of the feed-roller consequently altered at pleasure.

Operation of mill: The grain to be ground being placed in the hopper, the machine is set in motion by a strap from any adjacent shaft operating on the pulley O. This causes the feed-roller U to turn in the direction of the arrow. Now, as the circumference of the feed-roller is in close proximity to the lower edge of the hopper, the grain can escape by no other means than by entering the identations of the said roller, which carries certain quantities past the edge of the hopper in the direction of the arrow, and allows limited and regular quantities of grain to drop onto the circumference of the tapered steel-covered roller F at the point where the upper portion of the semicircular shield H terminates. The grain is now carried between the shield and the burr, and is acted upon by the oblique teeth on the pieces *h* and those on the steel covering of the burr, and as these teeth slant in contrary directions the cutting effect on the grain will be most powerful. And this efficiency is increased by the longitudinal grooves *i*, which, as the burr revolves, catch the grain and turn its direction between each of the pieces *h*. The grain thus partially ground, on leaving the point where the lower portion of the upper shield terminates, drops down a slide, *p*, onto the circumference of the lower burr, where it is again acted upon by the teeth on that burr and those on its shield, and being still further ground thereby is discharged below into any convenient receptacle. When it becomes necessary to grind the grain finer or coarser, by turning the screws L the shields may be brought in closer proximity with or farther from the burr and the desired effect thereby accomplished.

In order to prevent the grain from flying, I cover the burrs with guards of sheet-iron or other suitable material.

The whole mill does not occupy a space more than forty inches in height and twenty-eight inches in width, the cylinder being fourteen inches long and twelve inches in diameter at their largest ends, so that the whole may be readily moved about from place to place.

This mill, in addition to its diminutive size, has considerable advantage over the common burr-stones on account of the rapidity of friction in the former, while in the latter the grain has to pass around the stone in a serpentine direction.

When the teeth become worn by continual use, the steel pieces in the shield, as well as the steel covering of the burr, may be recut with facility.

I do not desire to confine myself to any particular number of shields and burrs, as in some cases one burr and one shield only may be found sufficient; in other cases two of each, and occasionally more, may be required.

Having now fully described my improved flouring-mill, what I claim, and desire to secure by Letters Patent, is—

The tapering burr F when covered with steel plates G, having teeth in disjointed lines and oblique with the axis of the burr, in combination with the steel pieces *h*, having also oblique teeth, but inclined in a contrary direction to those of the burr, and being dovetailed into projections cast to the shield H, the said projections forming longitudinal grooves *i*, running lengthwise on the cone and crossing the inclined dress, substantially in the manner and for the purposes set forth.

In testimony whereof I have signed my name to this specification this 7th day of July, 1856.

JOSEPH WEIS.

In presence of—
JOHN J. MAXWELL,
F. B. GORDON.